(12) United States Patent
Chen

(10) Patent No.: US 9,503,900 B2
(45) Date of Patent: Nov. 22, 2016

(54) METHOD AND SYSTEM OF PROTECTING FILES

(71) Applicant: Chiun Mai Communication Systems, Inc., New Taipei (TW)

(72) Inventor: Wei-Nan Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/582,815

(22) Filed: Dec. 24, 2014

(65) Prior Publication Data

US 2015/0193627 A1    Jul. 9, 2015

(30) Foreign Application Priority Data

Jan. 8, 2014  (CN) .......................... 2014 1 0008327

(51) Int. Cl.
| | |
|---|---|
| G06F 11/30 | (2006.01) |
| H04W 12/08 | (2009.01) |
| G06F 21/62 | (2013.01) |
| G06F 21/88 | (2013.01) |
| H04W 12/02 | (2009.01) |
| H04W 4/00 | (2009.01) |

(52) U.S. Cl.
CPC .............. *H04W 12/08* (2013.01); *G06F 21/62* (2013.01); *G06F 21/88* (2013.01); *H04W 12/02* (2013.01); *H04W 4/008* (2013.01)

(58) Field of Classification Search
CPC ... H04W 12/08; H04W 12/02; H04W 4/008; G06F 21/88; G06F 21/62
USPC ......................................................... 713/189
See application file for complete search history.

(56) References Cited

U.S. PATENT DOCUMENTS

| | | | |
|---|---|---|---|
| 8,467,770 B1* | 6/2013 | Ben Ayed ............. | H04L 63/107 455/41.1 |
| 2013/0198522 A1* | 8/2013 | Kohno .................... | G06F 21/62 713/182 |
| 2015/0172920 A1* | 6/2015 | Ben Ayed ............. | H04W 12/06 713/172 |

* cited by examiner

*Primary Examiner* — Mohammad W Reza
(74) *Attorney, Agent, or Firm* — Zhigang Ma

(57) ABSTRACT

Provided is a method of protecting files of an electronic device. In the method, a pre-setting return information is read in a wireless communication tag; a setting interface is provided; the files of the electronic device is selected through the setting interface; a predetermined protection time period and a pre-setting return information are set through the setting interface; wireless communication signal having a fixed frequency is transmitted by the electronic device; the selected files are encrypted if no pre-setting return information is obtained by the electronic device from the wireless communication tag; the selected files are deleted upon the condition that the selected files are encrypted for the predetermined protection time period.

10 Claims, 3 Drawing Sheets

METHOD AND SYSTEM OF PROTECTING FILES

FIELD

The subject matter herein generally relates to file protecting technologies, and particularly to a method and a system of protecting files of lost electronic products.

BACKGROUND

Nowadays, portable electronic products have many functions, for example, mobile wallet, electronic payment, etc. These functions are changing people's life style. These functions often relate to many personal files. If the portable electronic products are lost, the personal files might be compromised. Therefore, protecting the personal files of lost portable electronic products is necessary.

BRIEF DESCRIPTION OF THE DRAWINGS

Implementations of the present technology will now be described, by way of example only, with reference to the attached figures, wherein.

DETAILED DESCRIPTION

Figure 1:
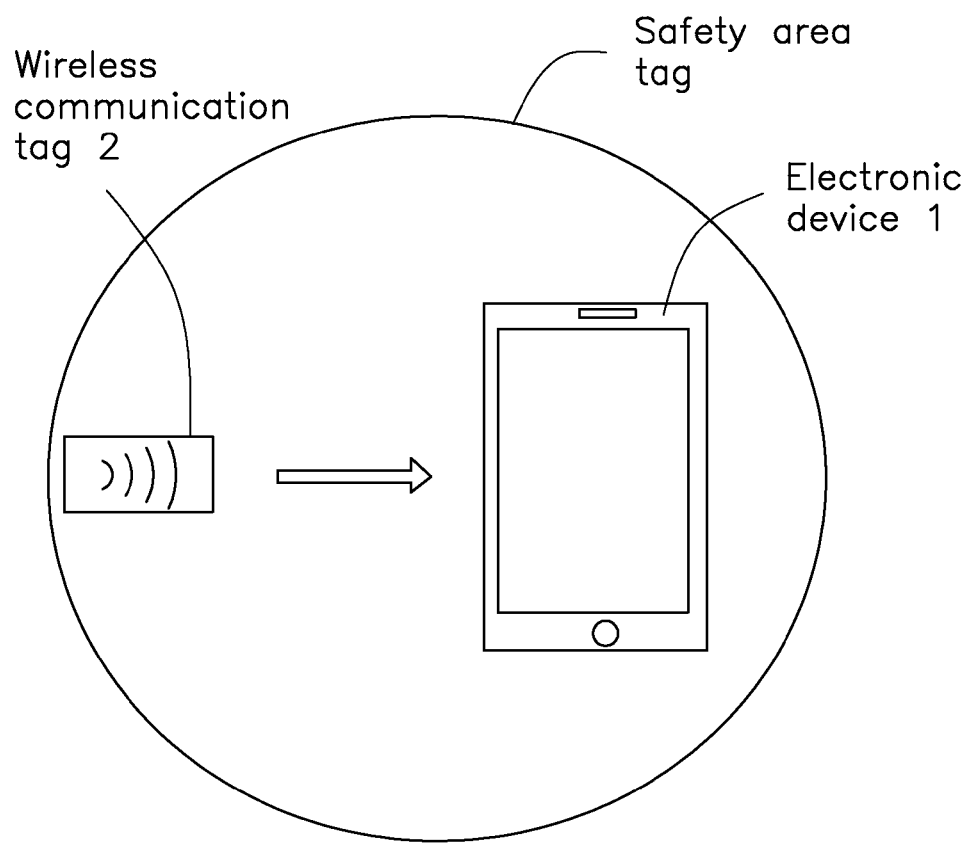
FIG. 1 is a diagram illustrating a working environment of a system of protecting files according to an embodiment of the instant disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

Referring to FIG. 1, a working environment for a system of protecting files is shown. The working environment includes an electronic device 1 having wireless communication function and a wireless communication tag 2. The electronic device 1 can be a cell phone, a tablet or other portable electronic devices. The wireless communication tag 2 can be Near Field Communication (NFC) tag, Radio Frequency Identification (RFID) tag or other wireless communication tag.

In a wireless communication area, the electronic device 1 can detect and read the wireless communication tag 2, so as to obtain one or more safety areas. The electronic device 1 transmits a wireless communication signal having a fixed frequency through its wireless communication unit. When an available wireless communication tag 2 exits in the wireless communication area, the electronic device 1 reads the return signal from the wireless communication tag 2. If the electronic device 1 can receive the return signal from the wireless communication tag 2, it is determined that the electronic device 1 is in the safety area; otherwise, the electronic device 1 is locating beyond the wireless communication area and is located in non-safety area, and the system 10 would protect private files stored in the electronic device 1. If the time period that the electronic device 1 stays away from the safety area exceeds a predetermined time period, the system 10 would run a deleting program to delete the private files.

Figure 2:
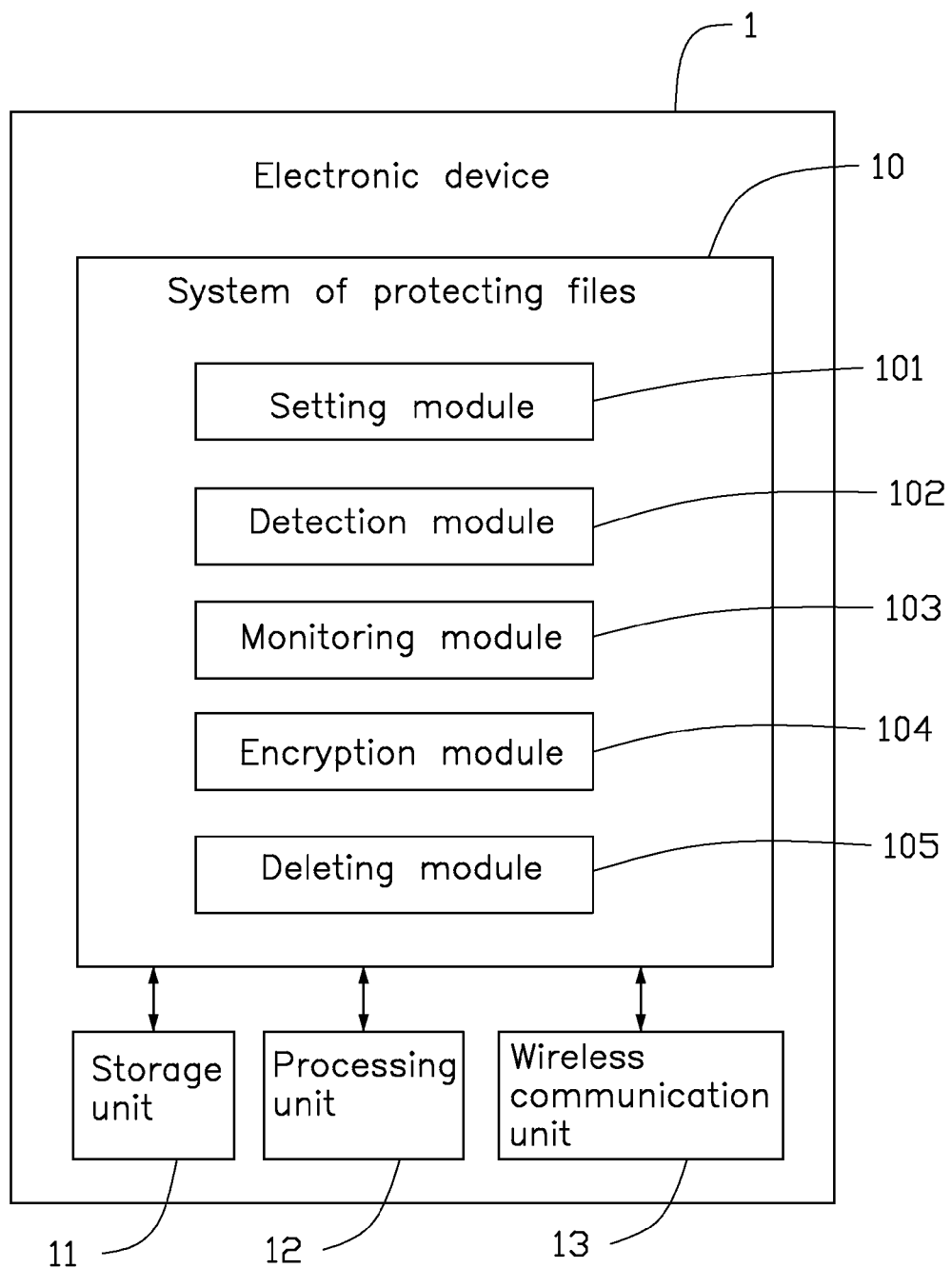
FIG. 2 is a block diagram illustrating the system of protecting files.

Referring to FIG. 2, in the illustrated embodiment, the system 10 is stored in the electronic device 1 and executed by the electronic device 1. The electronic device 1 includes a storage unit 11, a processing unit 12, and a wireless communication unit 13. The storage unit 11 stores source code and data of the system 10. The storage unit 11 can be random access memory of the electronic device 1 or external storage card, for example secure digital card. The wireless communication unit 13 transmits a wireless communication signal having a fixed frequency and receives the information from the wireless communication tag 2 in the wireless communication area. The wireless communication unit 13 can be NFC unit, RFID unit, or other wireless communication units.

In the illustrated embodiment, the system 10 includes a setting module 101, a detection module 102, a monitoring module 103, an encryption module 104, and a deleting module 105. The word "module," as used hereinafter, refers to a collection of software instructions which are stored in storage unit 11 and can be executed by the processing unit 12.

Figure 3:
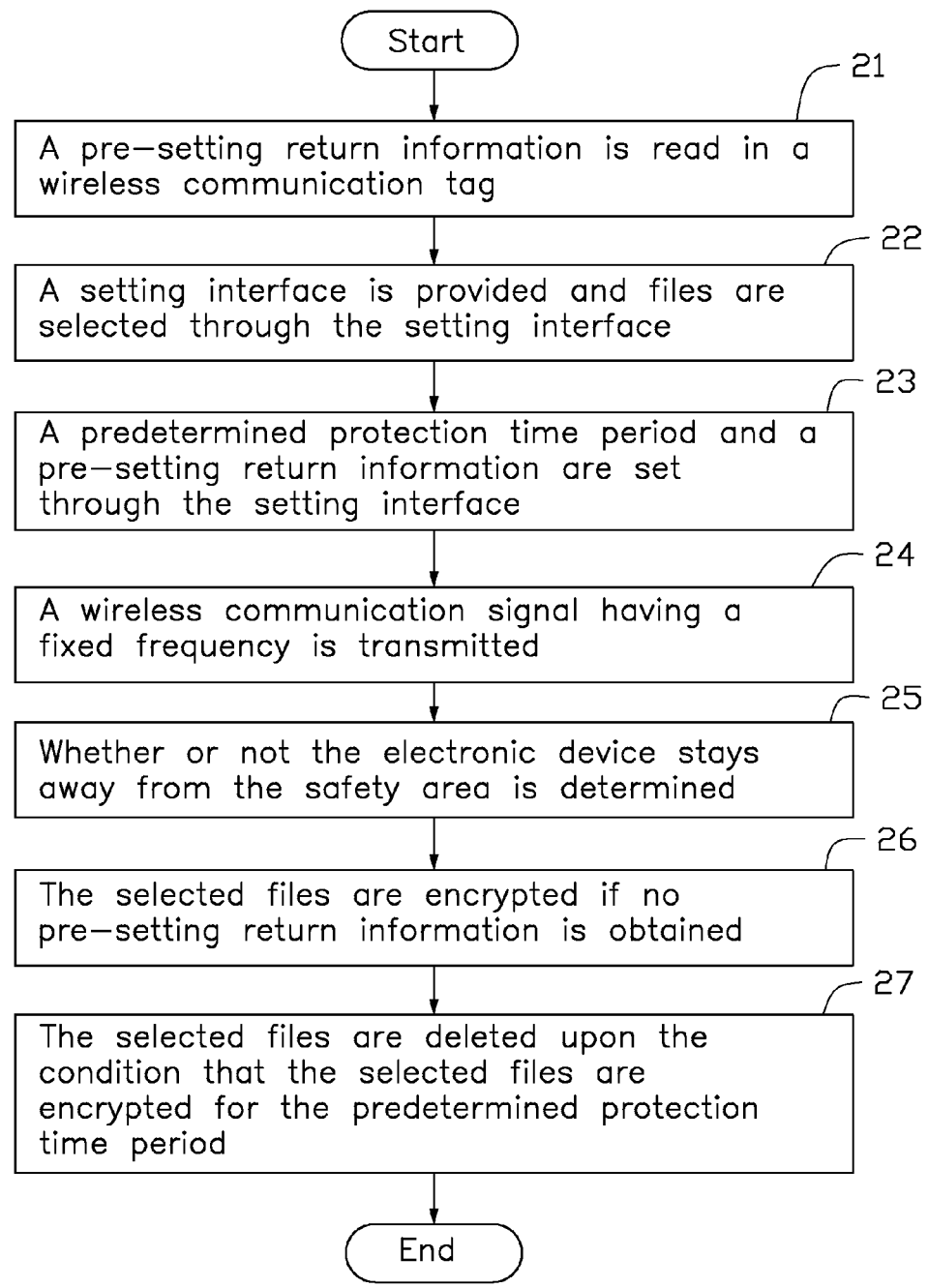
FIG. 3 is a flowchart illustrating a method of protecting files according to an embodiment of the instant disclosure.

Referring to FIG. 3, a flowchart is presented in accordance with an example embodiment. An example method is provided by way of example, as there are a variety of ways to carry out the method. The example method described below can be carried out using the configurations illustrated in FIG. 3, for example, and various elements of these figures are referenced in explaining example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 21.

At block 21, a pre-setting return information is read in a wireless communication tag.

In the illustrated embodiment, a pre-setting return information is read in the wireless communication tag 2 and then the wireless communication tag 2 is placed in sites where the electronic device 1 often shows up, such that the electronic device 1 is placed in a safety area where the electronic device 1 can detect the wireless communication tag 2. For example, the wireless communication tag 2 can be placed in users' offices or homes, the wireless communication tag 2 can also be taken by the users, for example, the wireless communication tag 2 can be placed in the users' pockets or briefcases. The pre-setting return information can be "you are in the safety area." The pre-setting return information can also be some signs, for example, "1818168," or "@#¥%&."

At block 22, a setting interface is provided and files are selected through the setting interface.

The setting module 101 provides a setting interface and the users can select files to encrypt through the setting interface. The selected files can be users' private files.

At block 23, a predetermined protection time period and a pre-setting return information are set through the setting interface.

When the electronic device 1 does not receive the pre-setting return information from the wireless communication tag 2 for the predetermined protection time period, the electronic device 1 would delete the selected files. For example, the predetermined protection time period is 2 hours and the pre-setting return information is "1818168." When the electronic device 1 stays in the safety area, the electronic device 1 could receive the pre-setting return information from the wireless communication tag 2. When the electronic device 1 stays away from the safety area for 2 hours, the electronic device 1 would delete the selected files.

At block 24, a wireless communication signal having a fixed frequency is transmitted.

The electronic device 1 transmits a wireless communication signal having a fixed frequency through the wireless communication module 13. When the wireless communication tag 2 exits in the safety area, the detection module 102 reads the information stored in the wireless communication tag 2.

At block 25, whether or not the electronic device 1 stays away from the safety area is determined.

The monitoring module 103 monitors the information read by the detection module 102 and determines whether or not the electronic device 1 stays away from the safety area. If the electronic device 1 stays away from the safety area, no information is received by the electronic device 1 from the wireless communication tag 2; otherwise, the monitoring module 103 determines whether the information obtained at block 23 is the pre-setting return information; if the information obtained at block 23 is the pre-setting return information, it is determined that the electronic device 1 stays in the safety area; otherwise, the electronic device 1 stays away from the safety area.

At block 26, the selected files are encrypted if no pre-setting return information is obtained.

If the monitoring module 103 cannot monitor the pre-setting return information from the information read by the detection module 102, it is determined that the electronic device 1 stays away from the safety area and the encryption module 104 encrypts the selected files. In encryption, the selected files can be hidden or be accessed only by password.

At block 27, the selected files are deleted upon the condition that the selected files are encrypted for the pre-determined protection time period.

The monitoring module 103 monitors the time period that the selected files are encrypted. If the time period that the selected files are encrypted exceeds the predetermined protection time period, the deleting module 105 deletes the selected files or formats the area storing the selected files.

It is noted that when the selected files are encrypted, but the time period that the selected files are encrypted does not exceed the predetermined protection time period, the detection module 102 keeps transmitting the wireless communication signal having the fixed frequency. When the monitoring module 103 monitors that the detection module 102 obtains the pre-setting return information again, it is determined that the electronic device 1 comes back the safety area, and the encryption module 104 decrypts the selected files.

Through the blocks 21-27, the private files of lost electronic devices can be protected, so as to prevent users' privacy from leaking or prevent the users' property from damaging.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims.

What is claimed is:

1. A method of protecting files of an electronic device, comprising:
   reading a pre-setting return information in a wireless communication tag;
   providing a setting interface;
   selecting the files of the electronic device through the setting interface;
   setting a predetermined protection time period and a pre-setting return information through the setting interface;
   transmitting a wireless communication signal having a fixed frequency by using the electronic device;
   encrypting the selected files if no pre-setting return information is obtained by the electronic device from the wireless communication tag; and
   deleting the selected files upon the condition that the selected files are encrypted for the predetermined protection time period.

2. The method of claim 1, wherein the wireless communication tag is a Near Field Communication (NFC) tag or a Radio Frequency Identification (RFID) tag.

3. The method of claim 2, wherein the electronic device comprises an NFC unit or an RFID unit.

4. The method of claim 1, wherein the setting interface is provided by the electronic device.

5. An electronic device, comprising:
   a wireless communication unit;
   a storage unit;
   a processing unit;
   one or more programs that are stored in the storage unit and are executed by the processing unit, the one or more programs comprising:
   a setting module that provides a setting interface for selecting files of the electronic device and setting a predetermined protection time period and a return information;
   a detection module that controls the wireless communication unit to transmit a wireless communication signal having a fixed frequency and to receive an information from an available wireless communication tag;
   a monitoring module that monitors the information received by the wireless communication unit and determines whether the information comprises the return information;
   an encryption module that encrypts the selected files if no return information is received by the wireless communication unit, the monitoring module also determining whether the time period that the selected files are encrypted exceeds the predetermined protection time period; and a deleting module that deletes the encrypted files upon the condition that the time period that the selected files are encrypted exceeds the predetermined protection time period.

6. The electronic device of claim 5, wherein the wireless communication unit is an NFC unit or an RFID unit.

7. The electronic device of claim 5, wherein the wireless communication tag is an NFC tag or an RFID tag.

8. The electronic device of claim 5, wherein the detection module controls the wireless communication unit to keep transmitting the wireless communication signal having the fixed frequency when the selected files are encrypted and the time period that the selected files are encrypted does not exceed the predetermined protection time period.

9. The electronic device of claim 5, wherein the encryption module decrypts the encrypted files when the monitoring module monitors that the return information from the wireless communication tag is received by the wireless communication unit again.

10. The electronic device of claim 5, wherein the wireless communication unit detects the wireless communication tag and connects the wireless communication tag to generate a safety area, the monitoring module determines that the electronic device stays away from the safety area when no return information from the wireless communication tag is received by the wireless communication unit.

* * * * *